US007570377B2

(12) United States Patent
Fukuhara (10) Patent No.: US 7,570,377 B2
(45) Date of Patent: Aug. 4, 2009

(54) IMAGE PROCESSING APPARATUS

(75) Inventor: Takanori Fukuhara, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 893 days.

(21) Appl. No.: 10/940,066

(22) Filed: Sep. 13, 2004

(65) Prior Publication Data

US 2006/0055971 A1   Mar. 16, 2006

(51) Int. Cl.
*H04N 1/40* (2006.01)
*G06K 15/00* (2006.01)
*G06F 15/177* (2006.01)
*G06F 11/00* (2006.01)

(52) U.S. Cl. ............ 358/1.14; 358/3.04; 358/1.17; 358/1.16; 358/1.15; 709/224; 714/11

(58) Field of Classification Search ............ 358/1.15; 714/25, 742, 1, 11; 709/224; 702/115; 369/53.16
See application file for complete search history.

(56) References Cited

U.S. PATENT DOCUMENTS 5,835,465 A * 11/1998 Yachida ............... 369/53.16

| 5,901,281 | A | * | 5/1999 | Miyao et al. | .......... 714/11 |
| 6,216,236 | B1 | * | 4/2001 | Miyao et al. | .......... 714/11 |
| 7,174,264 | B2 | * | 2/2007 | Yasukawa et al. | .......... 702/115 |
| 2003/0103233 | A1 | * | 6/2003 | Struble | .......... 358/1.15 |
| 2004/0117387 | A1 | * | 6/2004 | Civetta et al. | .......... 707/100 |
| 2004/0153689 | A1 | * | 8/2004 | Assaf | .......... 714/1 |
| 2004/0205399 | A1 | * | 10/2004 | Wang et al. | .......... 714/25 |
| 2005/0050423 | A1 | * | 3/2005 | Yasukawa et al. | .......... 714/742 |
| 2005/0091369 | A1 | * | 4/2005 | Jones | .......... 709/224 |

FOREIGN PATENT DOCUMENTS

JP    09-284517    10/1997

* cited by examiner

*Primary Examiner*—King Y Poon
*Assistant Examiner*—Akwasi M Sarpong
(74) *Attorney, Agent, or Firm*—SoCal IP Law Group LLP; Steven C. Sereboff; John E. Gunther (57) ABSTRACT

The state of an HDD provided in an image processing apparatus is divided into a plurality of levels and information is given to call user's attention when the state of the HDD is set at a level which indicates that attention should be paid to the state of the HDD. When the state of the HDD is set at a level indicating that the HDD should be exchanged, a warning is given to the user and information indicating that the HDD should be exchanged is issued to a service center. Further, data of the HDD is backed up in an external device if the state of the HDD is set at a level indicating a state which is set up immediately before the HDD becomes faulty.

16 Claims, 4 Drawing Sheets

IMAGE PROCESSING APPARATUS

BACKGROUND OF THE INVENTION

1. Field of the Invention

This invention relates to an image processing apparatus such as a digital multi-function peripheral having a storage device such as a hard disk drive, for example.

2. Description of the Related Art

Recently, in an image processing apparatus such as a digital multi-function peripheral, a hard disk drive (HDD) is provided. In the HDD provided in the digital multi-function peripheral, information such as image data, management data and a control program is stored. It the HDD becomes faulty, the digital multi-function peripheral abruptly becomes unusable. Further, if the HDD becomes faulty, important data stored in the HDD cannot be recovered since no back up means for storing the data is provided. Thus, data in the HDD cannot be recovered in some cases.

The following technique is described in Jpn. Pat. Appln. KOKAI Publication H9-284517. That is, when an access error with respect to the HDD occurs, a history of occurrence of defective blocks is stored in a management area provided in the HDD, and when the number of defective blocks exceeds a preset number, a fault warning is issued. Thus, in the technique described in. Jpn. Pat. Appln. KOKAI Publication H9-284517, the above problem is solved by predicting occurrence of the fault of the HDD by use of the number of access errors and displaying the fault warning.

However, in the technique described in Jpn. Pat. Appln. KOKAI Publication H9-284517, since defective blocks are managed in the HDD, there occurs a possibility that the block itself under management becomes unnecessary. Further, if it becomes faulty before the preset number is reached, in the above technique, there occurs a possibility that data stored in the HDD will not be recovered

BRIEF SUMMARY OF THE INVENTION

An object of this invention is to provide an image processing apparatus which can enhance the reliability thereof and the protection performance of data stored therein.

An image processing apparatus according to an aspect of the invention comprises a storage device which stores various data items, a determining section which determines whether the state of the storage device is set at a first or second level, a first processing section which informs that attention should be paid to the state of the storage device when the determining section determines that the state of the storage device is set at the first level, and a second processing section which notifies exchange of the storage device when the determining section determines that the state of the storage device is set at the second level.

A control method of an image processing apparatus according to another aspect of the invention is applied to an image processing apparatus having a storage device which stores various data items and comprises determining whether the state of the storage device is set at a first or second level, performing a first process which informs that attention should be paid to the state of the storage device when it is determined that the state of the storage device is set at the first level, and performing a second process which notifies exchange of the storage device when it is determined that the state of the storage device is set at the second level.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

There will now be described a preferable embodiment of this invention with reference to the accompanying drawings.

Figure 1:
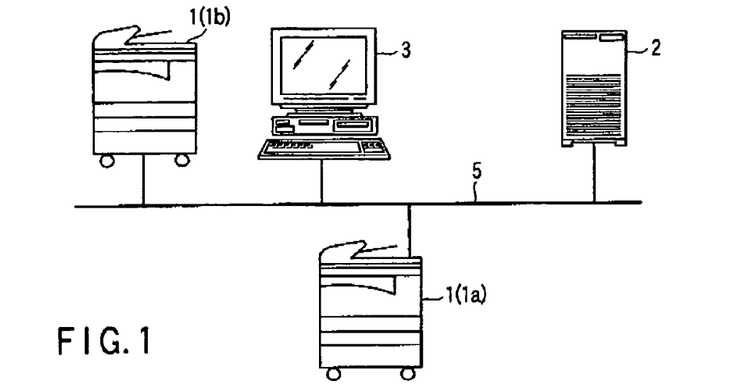
FIG. 1 is a view schematically showing an example of the configuration of an image processing system including a digital multi-function peripheral as an image processing apparatus according to an embodiment of this invention.

FIG. 1 is a view schematically showing an example of the configuration of an image processing system including a digital multi-function peripheral as an image processing apparatus according to an embodiment of this invention.

As shown in FIG. 1, the image processing system has a plurality of digital multi-function peripherals (MFPs) 1, client PC 3, file server 2 and the like connected to one another via a network 5 such as a local area network.

The digital multi-function peripheral 1 mainly has a copy function, printer function, scanner function, network communication function, electronic mail transmission/reception function and facsimile data transmission/reception function. In the present system, it is assumed that a plurality of digital multi-function peripherals 1 are connected to one another via the network 5.

The file server 2 is a server which holds and manages data. The file server 2 is configured by a server computer having a large-capacity storage device. In the present system, the file server 2 has a function of backing up data in an HDD in the digital multi-function peripheral 1 as will be described later.

The client PC 3 is a computer (PC) which the user uses. In the present system, a plurality of client PCs 3 can be connected to the network 5. In the following explanation, it is assumed that the client PC 3 is a computer of the manager of the digital multi-function peripheral 1 or a whole portion of the present system.

Next, the configuration of the digital multi-function peripheral 1 is explained.

Figure 2:
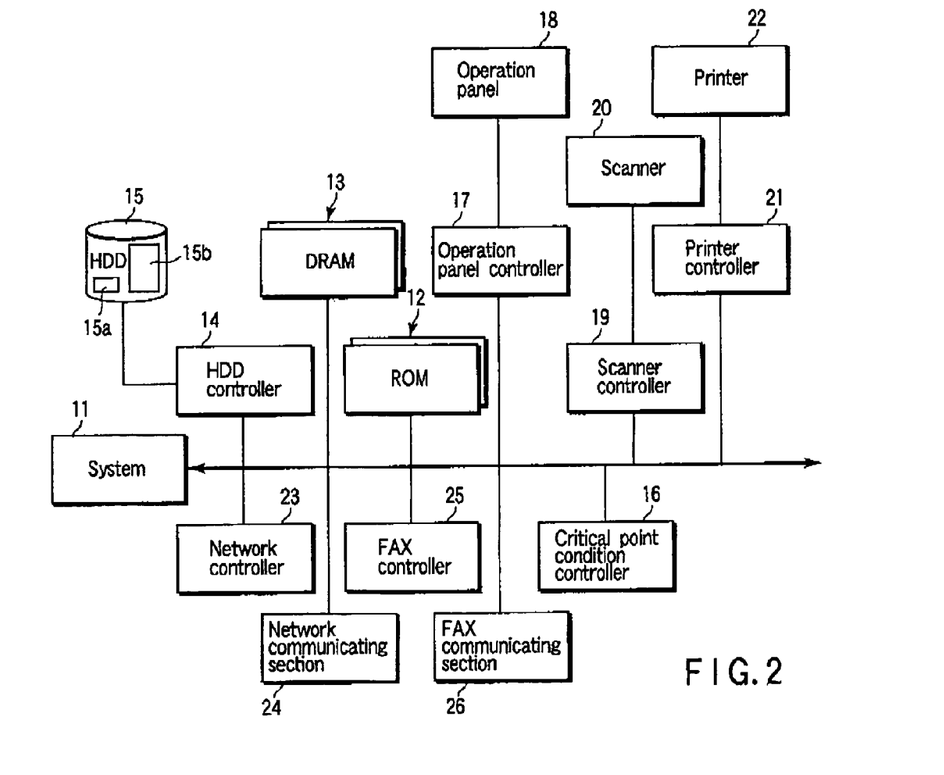
FIG. 2 is a block diagram schematically showing the configuration of the digital multi-function peripheral.

FIG. 2 is a block diagram schematically showing the configuration of the digital multi-function peripheral 1.

As shown in FIG. 2, the digital multi-function peripheral 1 includes a system controller 11, ROM (Read Only Memory) 12, DRAM (Random Access Memory) 13, hard disk drive (HDD) controller 14, hard disk drive 15, critical-point condition managing section 16, operation panel controller 17, operation panel 18, scanner controller 19, scanner 20, printer controller 21, printer 22, network controller 23, network communicating section 24, facsimile (FAX) controller 25 and facsimile (FAX) communicating section 26.

The system controller 11 controls the whole portion of the digital multi-function peripheral 1. The ROM 12 is configured by a nonvolatile memory. In the ROM 12, a control program used to control the digital multi-function peripheral 1 and control data are stored. The DRAM 13 is configured by a volatile versatile memory. In the RAM 13, data obtained in the course of the operation is temporarily stored.

The hard disk drive controller 14 is an interface for the HDD 15 and controls access to the HDD 15. The HDD 15 is a large-capacity storage device. In the HDD 15, for example, image data scanned by the scanner 20, image data to be printed by the printer 22, templates of a document, address book data of an electronic mail or FAX transmission destination, control software or various setting information items of the digital multi-function peripheral 1 are stored.

Further, the HDD 15 has a self-diagnosing function. The self-diagnosing function is a function previously installed in the HDD 15. The self-diagnosing function is a function of collecting information of the readout or write error rate by the HDD itself and treats the collected information as self-diagnosis information. For example, the HDD which is in conformity with the ATA3 specification has the self-diagnosing function of SMART (Self-Monitoring Analysis and Reporting Technology). The self-diagnosis information is information which can be read out by use of the HDD controller 14.

The critical-point condition managing section 16 manages the state of the HDD 15. The critical point condition managing section 16 determines whether or not the HDD 15 reaches a preset critical point based on the self-diagnosis information obtained by use of the self-diagnosing function of the HDD 15. For example, in the critical-point condition managing section 16, the state of the HDD 15 is determined by comparing values of respective items such as the error rate or seek error rate used as the self-diagnosis information of the HDD 15 with threshold values set in correspondence to the respective items. Further, in the present embodiment, the critical-point condition managing section 16 manages the state of the HDD 15 by dividing the same into a plurality of levels.

The operation panel controller 17 controls the operation panel 18. The operation panel 18 is a user interface having a display portion and operating portion. That is, the operation panel 18 displays operation guidance for the user, the operation setting state of the digital multi-function peripheral and the like on the display portion and permits the operating portion to input an operation instruction from the user. For example, the operation panel 18 is configured by a display device containing a touch panel and a hard-key pad such as a ten-key pad.

The scanner controller 19 controls the scanner 20. The scanner 20 reads an image of a document. For example, the scanner 20 reads an image of the document by photo-electrically converting an image obtained by optically scanning the image of the document and thus converting the image of the document into image data.

The printer controller 21 controls the printer 22. The printer 22 forms an image on an image forming medium. For example, the printer 22 forms an image on an image forming medium based on image data read by the scanner 20 or image data supplied from the exterior.

The network controller 23 controls data communication in the network 5 by the network communicating section 24. The network communicating section 24 is a network interface which makes data communication with devices in the network 5. Further, transmission/reception of a facsimile via the network or an electronic mail to the exterior of the network 5 can be attained by use of the network communicating section 24 controlled by the network controller 23.

The facsimile controller 25 controls FAX communication by the facsimile communicating section 26. The facsimile communicating section 26 is an interface which transmits/receives FAX data with respect to the exterior via a FAX line or the like.

Next, the self-diagnosing function of the HDD 15 is explained.

As described above, the HDD 15 has the self-diagnosing function. The self-diagnosing function is a function for causing the HDD itself to collect self-diagnosis information such as the error rate and seek error rate. As the self-diagnosing function, the technology of SMART (Self-Monitoring Analysis and Reporting Technology) utilized in the HDD of the ATA3 specification is used.

Generally, in HDDs, an error occurs when the rotation speed of a motor in the HDD exceeds a critical point and is lowered, when a spindle motor in the HDD is damaged die to external impact during the rotation or when a head in the HDD does not perform the seek operation. The HDD which may cause an error due to the above reason will not be abruptly destroyed and a symptom occurs without fail before the destruction. The main object of the self-diagnosing function is to detect the symptom before the HDD 15 is destroyed. Therefore, the state of the HDD having the self-diagnosing function can be determined based on the self-diagnosis information collected by use of the self-diagnosing function.

Next, the state checking process of the HDD 15 is explained.

In the present embodiment, the state of the HDD 15 is determined as state levels 0 to 3. That is, the state of the HDD 15 is managed by dividing the same into four levels. Further, it is assumed that the state level 0 is a normal state of the HDD 15. The state level 1 indicates a level in which attention should be paid to the fault state of the HDD 15. The state level 2 indicates a level in which exchange of the HDD 15 is necessary. The state level 3 indicates a dangerous state which is set up immediately before the HDD 15 becomes faulty.

Figure 3:
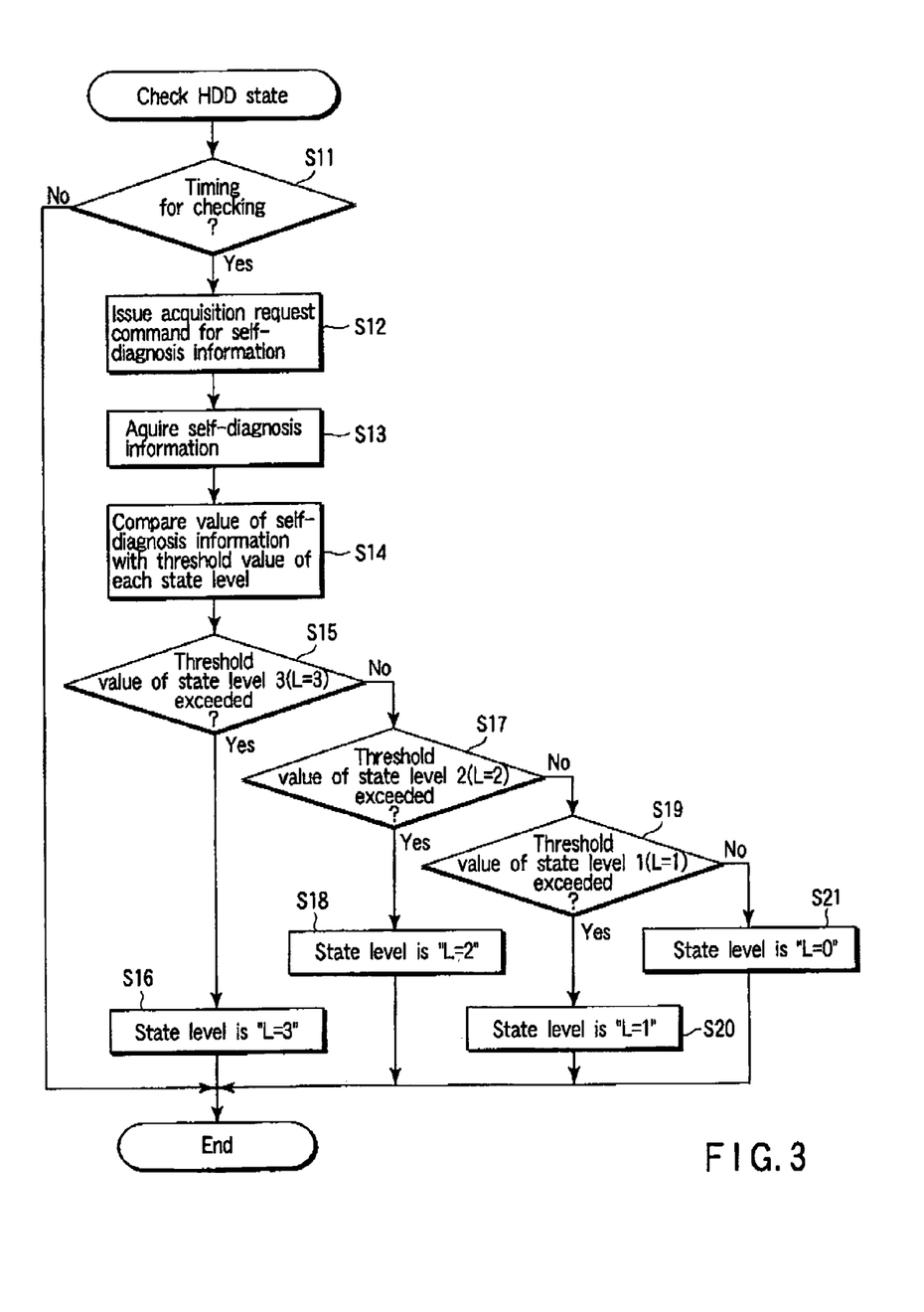
FIG. 3 is a flowchart for illustrating a state checking process which determines the state of an HDD.

FIG. 3 is a flowchart for illustrating a state checking process which determines the state of the HDD 15.

First, the state checking process of the HDD 15 is performed at a preset timing. For example, the state checking process of the HDD 15 may be performed when the main power supply (not shown) of the digital multi-function peripheral 1 is turned ON or may be performed at predetermined regular intervals.

When the timing at which the state checking process of the HDD 15 is performed arrives ("YES" in the step S11), the system controller 11 issues an acquisition request command for self-diagnosis information (step S12). The command is transmitted to the HDD 15 by use of the HDD controller 14. The HDD 15 collects the readout and write error rate and seek error rate at a desired time by use of the self-diagnosing function and stores the same as self-diagnosis information into a storage area (not shown). Therefore, the HDD 15 returns the error rate and seek error rate as the self-diagnosis information to the system controller 11 via the HDD controller 14 in response to the acquisition request command for self-diagnosis information. As a result, the system controller 11 acquires self-diagnosis information of the HDD 15 (step S13).

When acquiring the self-diagnosis information of the HDD 15, the system controller 11 compares values of the respective items of the error rate and seek error rate as the acquired self-diagnosis information with respective threshold values managed by the critical-point condition managing section 16 (step S14).

If it is determined in the above comparing process that the values of the respective items of the self-diagnosis information exceed the threshold value of the state level 3 set in the critical-point condition managing section 16 ("YES" in the step S15), the system controller 11 determines that the state of the HDD 15 is set at the state level 3. In this case, the system controller 11 sets data indicating that the state of the HDD 15 is set at the state level 3 into the critical-point condition managing section 16 (step S16).

When it is determined that the values of the respective items of the self-diagnosis information exceed the threshold value of the state level 2 set in the critical-point condition managing section 16 ("YES" in the step S17), the system controller 11 determines that the state of the HDD 15 is set at the state level 2. In this case, the system controller 11 sets data indicating that the state of the HDD 15 is set in the state level 2 into the critical-point condition managing section 16 (step S18).

Further, when it is determined that the values of the respective items of the self-diagnosis information exceed the threshold value of the state level 1 set in the critical-point condition managing section 16 ("YES" in the step S19), the system controller 11 determines that the state of the HDD 15 is set at the state level 1. In this case, the system controller 11 sets data indicating that the state of the HDD 15 is set at the state level 1 into the critical-point condition managing section 16 (step S20).

When it is determined that the value of each item of the self-diagnosis information does not exceed the threshold value of the state level 1 set in the critical-point condition managing section 16 ("NO" in the step S19), the system controller 11 determines that the state of the HDD 15 is set at the state level 0 (that is, in the normal state). In this case, the system controller 11 sets data indicating that the state of the HDD 15 is set at the state level 0 into the critical-point condition managing section 16 (step S21).

Determination of the state level of the HDD 15 may be made by comparing the self-diagnosis information acquired in the preceding state checking process with the self-diagnosis information acquired in the present state checking process and making a comparison with the threshold value when the result of comparison is changed. Further, as the value used as the threshold value, a value which the maker of the HDD independently sets as the self-diagnosing function can be used.

Next, a control process which is performed according to the state level of the HDD 15 is explained.

Figure 4:
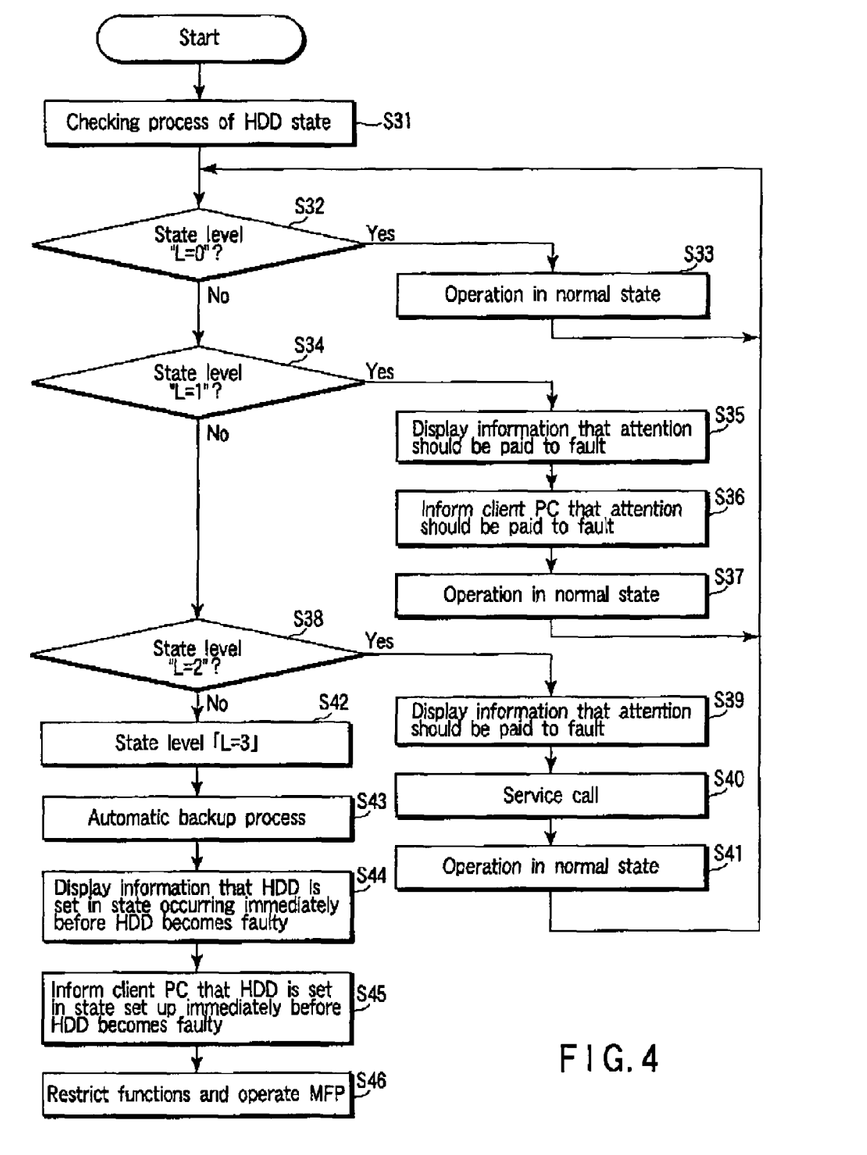
FIG. 4 is a flowchart for illustrating an example of the operation of the digital multi-function peripheral according to a state level of the HDD.

FIG. 4 is a flowchart for illustrating an example of the operation of the digital multi-function peripheral according to the state level of the HDD 15.

First, it is assumed that the system controller 11 performs the state checking process of the HDD 15 (step S31). As described above, the state level of the HDD 15 is set in the critical-point condition managing section 16 by performing the state checking process of the HDD 15. Therefore, the system controller 11 can determine the state level of the HDD 15 obtained in the newest state checking process by referring to the state level of the HDD 15 set in the critical-point condition managing section 16.

First, the system controller 11 determines whether or not the state level of the HDD 15 is set at the level 0 (step S32). If it is determined in the above determination process that the state level of the HDD 15 is set at the level 0 ("YES" in the step S32), the system controller 11 determines that the HDD 15 is set in the normal state, that is, the HDD 15 is operated without causing any problem. In this case, the system controller 11 causes the digital multi-function peripheral 1 to perform the normal operation (step S33).

Further, when it is determined in the above determination process that the state level of the HDD 15 is set at the level 1 ("YES" in the step S34), the system controller 11 determines that the HDD 15 is set at the state level 1, that is, the HDD 15 is about to enter a faulty condition. In this case, the system controller 11 displays guidance indicating that attention should be paid to the fault of the HDD 15 on the operation panel 18 so as to draw user's attention to the fault of the HDD 15 (step S35).

The system controller 11 sends guidance to the operation panel 18 and guidance indicating that attention should be paid to the fault of the HDD 15 to the client PC 3 which is the user of the digital multi-function peripheral 1 (step S36). This is realized by causing the network communicating section 24 to inform the client PC 3 that attention should be paid to the fault of the HDD 15. On the other hand, in the client PC 3, the above guidance from the digital multi-function peripheral 1 may be displayed as a pop-up message by use of a utility tool such as a print monitor which is previously installed.

Further, the system controller 11 determines that exchange of the HDD 15 is not necessary when it is set at the state level 1 and causes the digital multi-function peripheral 1 to perform the normal operation while displaying guidance indicating that attention should be paid to the fault of the HDD 15 (step S37).

Further, when it is determined in the above determination process that the state level of the HDD 15 is set at the level 2 ("YES" in the step S38), the system controller 11 determines that the HDD 15 is set at the state level 2, that is, exchange of the HDD 15 is necessary. In this case, the system controller 11 displays a warning indicating that the HDD 15 should be replaced by a service personnel on the operation panel 18 so as to inform the user that it is necessary to exchange the HDD 15 (step S39).

At this time, since expert knowledge and skill are required for exchange of the HDD 15, it is assumed that exchange of the HDD 15 is made only by a service personnel. In this case, it is necessary to inform (make a service call to) the service personnel that the HDD 15 is required to be replaced.

Therefore, the system controller 11 informs the service personnel (a facsimile device installed at the service center where the service personnel stays) about information which is used to identify the digital multi-function peripheral and to the effect that the HDD 15 should be replaced, by use of the FAX communicating section 26 when it is determined that the HDD 15 is set at the state level 2 (step S40).

In this case, it is assumed that the transmission destination of the facsimile addressed to the service personnel is previously stored in a memory (not shown). Further, the contents of the facsimile which requests the exchange of the HDD 15 are formed according to a preset format If the digital multi-function peripheral 1 has a communication function with respect to an external network such as the Internet, it is possible to transmit a notification which requests exchange of the HDD 15 to the service personnel by use of an electronic mail or the like.

Further, the system controller 11 determines that it is necessary to exchange the HDD 15 when it is set at the state level 2, but the HDD 15 can be used until the HDD is actually replaced. Therefore, it causes the digital multi-function peripheral 1 to perform the normal operation while a warning indicating that the HDD 15 should be replaced is being displayed (step S41). In this case, it is also possible to place importance on the safety of data in the HDD 15 even when it is set at the state level 2 and inhibit the operation of the digital multi-function peripheral or restrict the function as shown in the step S45 which will be described later.

Further, when it is determined in the above determination process that the state level of the HDD 15 is set at the level 3 ("NO" in the step S38), the system controller 11 determines that the HUD 15 is set at the state level 3, that is, the HDD 15 is set in a state which occurs immediately before becoming faulty (step S42). In this case, in order to protect data in the HDD 15, the system controller 11 instantly performs the backup process for the data in the HDD 15 (step S43). The backup process is a process which stores the data of the HDD 15 in another device (for example, file server 2 or another digital multi-function peripheral) connected to the network 5. The backup process is explained in detail later.

Further, the system controller 11 displays the state of the HDD 15 set up immediately before becoming faulty on the operation panel 18 (step S44) and informs the client PC 3 that the HDD 15 is set in a state set up immediately before becoming faulty (step S45). In this case, the client PC 3 causes a utility tool such as a print monitor which is previously installed to display that the HDD 15 is set in a state set up immediately before becoming faulty as a popup message. Thus, it is possible to notify that the HDD 15 is set in a state set up immediately before becoming faulty to the user who directly uses the digital multi-function peripheral 1 by use of the operation panel 18 and the user who uses the digital multi-function peripheral 1 via the network 5 by use of the client PC 3.

Further, the system controller 11 determines that data in the HDD 15 cannot be safely protected, restricts the function of the digital multi-function peripheral 1 and operates the same (step S46).

For example, as the limitation of the function of the digital multi-function peripheral 1 in the case of the state level 3, the function which can be performed without using the HDD 15 is carried out. Further, as the limitation of the function of the digital multi-function peripheral 1 in the case of the state level 3, functions which can be used even when safety of data held in the HDD 15 cannot be ensured are previously set and only these functions can be carried out.

When the HDD 15 is set into the state level 3, the system controller 11 holds the digital multi-function peripheral 1 as it is, and therefore, the digital multi-function peripheral 1 can be set in the disable state.

As described above, the HDD state is divided into a plurality of levels and the respective levels are determined. If the HDD state is set at the level which makes it necessary to pay attention to the HDD state, the digital multi-function peripheral 1 urges the user to pay attention to the HDD state If the HDD state is set at the level indicating that exchange of the HDD is necessary, a warning is given to the user and information indicating that the HDD should be exchanged is sent to the service center. Further, if the HDD state is set at the level set immediately before becoming faulty, data in the HDD is backed up in the external device.

Thus, a symptom of the fault of the HDD is monitored and a warning to the user and information to the service center can be issued according to the HUD state or a backup of data in the HDD can be made. As a result, it becomes possible to previously prevent the digital multi-function peripheral from being abruptly unused by the fault of the HDD. Further, the service personnel can rapidly take a countermeasure to rapidly solve a problem of the digital multi-function peripheral caused by the fault of the HDD. In addition, data in the HDD can be automatically backed up according to the state of the HDD and the effect in view of the security for data protection can be expected.

Next, the backup process for data of the HDD 15 is explained.

Figure 5:
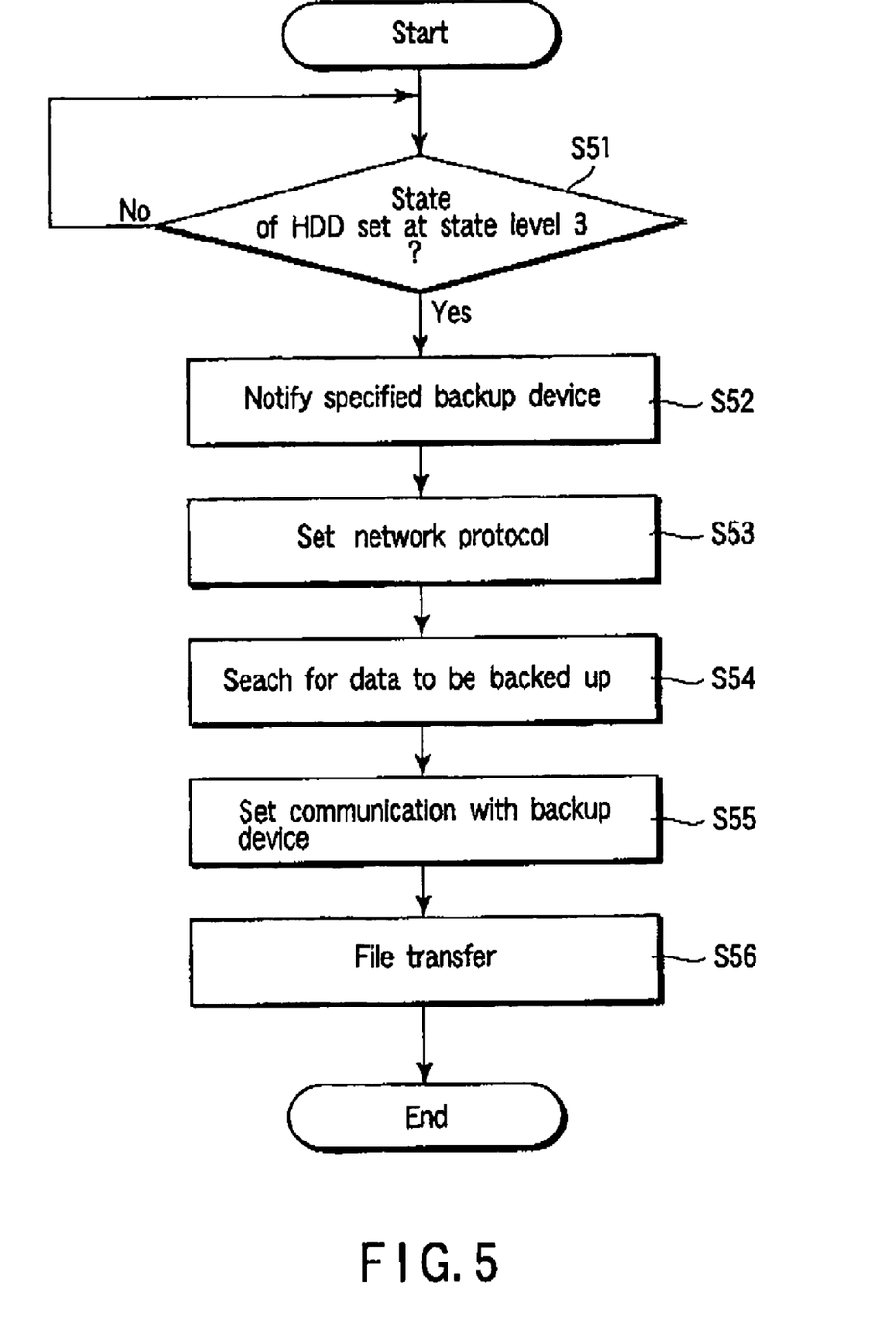
FIG. 5 is a flowchart for illustrating a backup process for data in the HDD.

It is assumed that the backup process is performed when the state of the HDD 15 is set into the state level 3. That is, in the case of the state level 3, the HDD 15 is in a state in which it may broke down at any time. Therefore, when the present digital multi-function peripheral 1 determines that the HDD 15 is set into the state level 3, it automatically backs up data of the HDD 15 into another digital multi-function peripheral or file server 2.

In this example, a case wherein important data of the HDD 15 or data which is previously specified to be backed up is backed up in the file server 2 which is previously set is explained. As the important data or data which is previously specified to be backed up, for example, image data of a high security level, management setting information of the digital multi-function peripheral, address book data, template information or the like can be used.

It is also assumed that a file database 15*a* and BOX 15*b* are provided in the HDD 15. The BOX 15*b* is an area in the HDD 15 which is managed by the file database 15*a*. That is, it is assumed that data is stored as a file in the BOX 15*b*.

Further, it is assumed that data such as the security levels which are weighted or data which is specified to be backed up is provided in the file. The weighted data or backup specified data in the file is managed by the file database 15*a*. Therefore, in the present embodiment, it is assumed that important data of high security level or data which is previously specified to be backed up is backed up in the automatic backup process. In the automatic backup process, all of the data in the HDD 15 may be backed up.

FIG. 5 is a flowchart for illustrating the backup process for data in the HDD 15. In this example, a case wherein important data in the HDD 15 and data which is specified to be backed up is backed up in the file server 2 is explained.

First, an application to back up data of the HDD 15 is installed in the file server 2. Further, on the digital multi-function peripheral 1 side, the file server 2 is previously specified as a backup destination.

If, in this state, it is determined that the state of the HDD 15 is set at the state level 3 by the above operation ("YES" in the step S51), the system controller 11 of the digital multi-function peripheral 1 determines that data of the HDD 15 is backed up into the file server 2. If it is determined by the above determination process that data of the HDD 15 is backed up in the file server 2, the system controller 11 informs the file server 2 that the HDD 15 is set in a state immediately before becoming faulty (or a request for backup) by use of the network communicating section 24 (step S52).

In response to reception of the above information, the file server 2 starts the application to back up data of the HDD 15. Then, the file server 2 makes preparation for reception of to-be-backed-up data which is transmitted from the digital multi-function peripheral 1.

Further, in the digital multi-function peripheral 1 which has issued the backup request to the file server 2, preparation for transfer of to-be-backed-up data of the HDD 15 to the file server 2 is made by the system controller 11. As the data transfer preparation, the system controller 11 first sets a network protocol for data transfer such as FTP, SAMB, HTTP (step S53).

After the network protocol is set, the system controller 11 searches for a file of data to be backed up among the files existing in the BOX 15*b* by use of the file database 15*a* of the HDD 15 (step S54). In this case, for example, it is assumed that a file of high security level and a file which is previously specified to be backed up are searched for as a file to be backed up.

If the file to be backed up is searched for, the system controller 11 handshakes with the application on the file server 2 side (step S55) and sequentially transfers the searched files to the file server 2 (step S56).

On the other hand, the file server 2 sequentially receives the files from the digital multi-function peripheral and sequentially stores the files received to the previously set directory into a storage device (not shown).

By the above operation, important data (files) stored in the HDD of the digital multi-function peripheral or data (files) specified to be backed up is backed up into the file server 2.

The data (files) stored into the file server 2 is programmed back into the HDD 15 of the digital multi-function peripheral 1 by use of the exclusive application after the HDD of the digital multi-function peripheral 1 is exchanged (or repaired).

Further, in the example of the above operation, a case where data of the HDD 15 is backed up into the file server 2 is explained. However, data of the HDD 15 of the digital multi-function peripheral 1*a* can be backed up into another digital multi-function peripheral 1*b* or the client PC 3 in the network 5 in the same manner as in the above operation.

For example, an application which is used to back up data of the HDD 15 of the digital multi-function peripheral 1 is previously installed in the client PC 3 and the client PC 3 is specified as a backup destination on the digital multi-function peripheral 1 side. As a result, data of the HDD 15 can be backed up into the client PC 3 in the same manner as in the above operation.

Further, an application which is used to back up data of the HDD 15 of the digital multi-function peripheral 1*a* is previously installed in the other digital multi-function peripheral 1*b* and the other digital multi-function peripheral 1*b* is specified as a backup destination in the digital multi-function peripheral 1*a*. As a result, data of the HDD 15 of the digital multi-function peripheral 1*a* can be backed up into the HDD 15 of the digital multi-function peripheral 1*b* in the same manner as in the above operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a storage device which stores various data items,
a determining section which determines whether the state of the storage device is set at one of first, second, and third levels, the third level corresponding to a state which is set up immediately before the storage device becomes faulty;
a first processing section which informs that attention should be paid to the state of the storage device when the determining section determines that the state of the storage device is set at the first level;
a second processing section which notifies exchange of the storage device when the determining section determines that the state of the storage device is set at the second level; and
a third processing section which backs up data of the storage device into an external device when the determining section determines that the state of the storage device is set at the third level,
wherein the third processing section restricts the function of the image processing apparatus to a function which is free from a problem even if the storage device becomes faulty when the determining section determines that the state of the storage device is set at the third level.

2. The image processing apparatus according to claim 1, wherein the storage device has a self-diagnosing function of diagnosing its own state and the determining section determines the state of the storage device based on self-diagnosis information obtained by the self-diagnosing function of the storage device.

3. The image processing apparatus according to claim 1, further comprising a display device and a network interface which makes communication with devices in a network to which the image processing apparatus is connected,
wherein the first processing section causes the display device to display guidance indicating that attention should be paid to the state of the storage device and informs an external device via the network interface to the effect that attention should be paid to the state of the storage device.

4. The image processing apparatus according to claim 1, further comprising a network interface which makes communication with devices in a network to which the image processing apparatus is connected,
wherein the second processing section informs the devices in the network via the network interface to the effect that the storage device should be exchanged.

5. The image processing apparatus according to claim 1, further comprising a facsimile interface which transmits a facsimile to an external device,
wherein the second processing section transmits information indicating that the storage device should be exchanged to a preset destination of a manager via the facsimile interface.

6. The image processing apparatus according to claim 1, further comprising an external communication interface which makes communication with a service center which provides a service for the image processing apparatus,
wherein the second processing section transmits information indicating that the storage device should be exchanged to the service center via the external communication interface.

7. The image processing apparatus according to claim 1, further comprising a network interface which makes communication with devices in a network to which the image processing apparatus is connected,
wherein the third processing section attains a communication state with an external device on the network previously set via the network interface and backs up data of the storage device into the external device when the determining section determines that the state of the storage device is set at the third level.

8. The image processing apparatus according to claim 1, wherein the third processing section searches for data which is required to be backed up among the data stored in the storage device and backs up the searched data which is required to be backed up into an external device when the determining section determines that the state of the storage device is set at the third level.

9. A control method of an image processing apparatus having a storage device which stores various data items, comprising:

determining whether the state of the storage device is set at one of first, second, and third levels, the third level corresponding to a state which is set up immediately before the storage device becomes fault;

performing a first process which informs that attention should be paid to the state of the storage device when the above determination process determines that the state of the storage device is set at the first level;

performing a second process which informs exchange of the storage device when the above determination process determines that the state of the storage device is set at the second level; and performing a third process which backs up data of the storage device into an external device is performed when it is determined by the determining process that the state of the storage device is set at the third level, wherein the third process is performed to restrict the function of the image processing apparatus to a function which is free from a problem even if the storage device becomes faulty when it is determined in the determining process that the state of the storage device is set at the third level.

10. The control method of the image processing apparatus according to claim 9, wherein the storage device has a self-diagnosing function of diagnosing its own state and the determining process is performed to determine the state of the storage device based on self diagnosis information obtained by the self-diagnosing function of the storage device.

11. The control method of the image processing apparatus according to claim 9, wherein the image processing apparatus further includes a display device and a network interface which makes communication with devices in a network to which the image processing apparatus is connected, and the first process is performed to cause the display device to display guidance indicating that attention should be paid to the state of the storage device and inform an external device in the network via the network interface to the effect that attention should be paid to the state of the storage device.

12. The control method of the image processing apparatus according to claim 9, wherein the image processing apparatus further includes a network interface which makes communication with devices in a network to which the image processing apparatus is connected, and the first process is performed to inform an external device in the network via the network interface to the effect that the storage device should be exchanged.

13. The control method of the image processing apparatus according to claim 9, wherein the image processing apparatus further includes a facsimile interface which transmits a facsimile to an external device, and the second process is performed to transmit information indicating that the storage device should be exchanged to a preset destination of a manager via the facsimile interface.

14. The control method of the image processing apparatus according to claim 9, wherein the image processing apparatus further includes an external communication interface which makes communication with a service center which provides a service for the image processing apparatus, and the second process is performed to transmit information indicating that the storage device should be exchanged to the service center via the external communication interface.

15. The control method of the image processing apparatus according to claim 9, wherein the image processing apparatus further includes a network interface which makes communication with devices in a network to which the image processing apparatus is connected, and the third process is performed to attain a communication state with an external device on the network previously set via the network interface and back up data of the storage device into the external device when it is determined in the determining process that the state of the storage device is set at the third level.

16. The control method of the image processing apparatus according to claim 9, wherein the third process is performed to search for data which is required to be backed up among the data stored in the storage device and back up the searched data which is required to be backed up into an external device when it is determined in the determining process that the state of the storage device is set at the third level.

* * * * *

UNITED STATES PATENT AND TRADEMARK OFFICE
CERTIFICATE OF CORRECTION

PATENT NO. : 7,570,377 B2 Page 1 of 1
APPLICATION NO. : 10/940066
DATED : August 4, 2009
INVENTOR(S) : Fukuhara It is certified that error appears in the above-identified patent and that said Letters Patent is hereby corrected as shown below:

Column 11, line 4 claim 9: replace "fault" with --faulty--

Signed and Sealed this

Fifteenth Day of September, 2009

David J. Kappos
*Director of the United States Patent and Trademark Office*